(12) United States Patent
Lirette et al.

(10) Patent No.: US 9,407,956 B2
(45) Date of Patent: Aug. 2, 2016

(54) IPTV DIAGNOSTICS SYSTEM

(71) Applicant: TELUS Communications Company, Edmonton (CA)

(72) Inventors: Marc Lirette, Edmonton (CA); James Brian Lakey, Edmonton (CA)

(73) Assignee: TELUS Communications Company, Edmonton (CA)

( * ) Notice: Subject to any disclaimer, the term of this patent is extended or adjusted under 35 U.S.C. 154(b) by 0 days.

(21) Appl. No.: 13/918,855

(22) Filed: Jun. 14, 2013

(65) Prior Publication Data
US 2014/0368665 A1    Dec. 18, 2014

(51) Int. Cl.
| | | |
|---|---|---|
| *H04N 21/234* | (2011.01) | |
| *H04N 21/24* | (2011.01) | |
| *H04N 21/443* | (2011.01) | |
| *H04N 21/647* | (2011.01) | |
| *H04N 21/442* | (2011.01) | |
| *H04N 21/643* | (2011.01) | |
| *H04N 17/04* | (2006.01) | |
| *H04N 21/433* | (2011.01) | |
| *H04N 21/438* | (2011.01) | |
| *H04N 21/6543* | (2011.01) | |

(52) U.S. Cl.
CPC ............. *H04N 21/442* (2013.01); *H04N 17/04* (2013.01); *H04N 21/24* (2013.01); *H04N 21/4334* (2013.01); *H04N 21/4383* (2013.01); *H04N 21/64322* (2013.01); *H04N 21/6543* (2013.01)

(58) Field of Classification Search
None
See application file for complete search history.

(56) References Cited

U.S. PATENT DOCUMENTS

| | | | |
|---|---|---|---|
| 5,243,651 A | 9/1993 | Parikh et al. | |
| 6,438,711 B2 | 8/2002 | Woodruff | |
| 7,392,301 B1 | 6/2008 | Perry, Jr. et al. | |
| 7,810,127 B2 | 10/2010 | Stanek et al. | |
| 8,175,223 B2 | 5/2012 | Narayanan et al. | |
| 8,339,968 B2 | 12/2012 | Howe et al. | |
| 2004/0093370 A1 | 5/2004 | Blair et al. | |
| 2007/0282748 A1* | 12/2007 | Saint Clair | H04L 41/06 705/51 |
| 2008/0022336 A1 | 1/2008 | Howcroft et al. | |
| 2008/0239971 A1* | 10/2008 | Miyakawa | H04L 12/2697 370/248 |
| 2008/0273856 A1* | 11/2008 | Bumgardner | H04N 5/782 386/292 |

(Continued)

FOREIGN PATENT DOCUMENTS

| | | | |
|---|---|---|---|
| WO | 2007/128097 A1 | 11/2007 | |
| WO | 2012/032193 A1 | 3/2012 | |

OTHER PUBLICATIONS

"Mariner FieldVU", Mariner [online], http://www.marinerpartners.com/en/home/products/xvu/fieldvu.print.aspx, accessed May 1, 2013.

(Continued)

*Primary Examiner* — Brian T Pendleton
*Assistant Examiner* — Jean D Saint Cyr
(74) *Attorney, Agent, or Firm* — Seed IP Law Group PLLC

(57) ABSTRACT

A method of testing a video decoding device connected to an IPTV service, the IPTV service having a server, the method comprising tuning the video decoding device to a first channel of the IPTV service, the video decoding device receiving the first channel and decoding video from the first channel, the video decoding device collecting data concerning the decoded video and sending the data to the server, detuning the video decoding device from the first channel, the server analyzing the data to generate results; and the server displaying the results.

19 Claims, 8 Drawing Sheets

(56) References Cited

U.S. PATENT DOCUMENTS

| | | | |
|---|---|---|---|
| 2009/0064251 A1* | 3/2009 | Savoor | G06F 11/2294 |
| | | | 725/110 |
| 2009/0161741 A1 | 6/2009 | Ginis et al. | |
| 2009/0168972 A1 | 7/2009 | Cioffi et al. | |
| 2009/0296584 A1* | 12/2009 | Bernard | H04L 41/5032 |
| | | | 370/241 |
| 2010/0166051 A1 | 7/2010 | Chung et al. | |
| 2011/0099597 A1 | 4/2011 | Boatright et al. | |
| 2011/0228665 A1 | 9/2011 | Kumar et al. | |
| 2012/0105724 A1 | 5/2012 | Candelore | |
| 2012/0151549 A1* | 6/2012 | Kumar | H04N 17/004 |
| | | | 725/131 |
| 2013/0347045 A1* | 12/2013 | Jenkin | H04N 21/443 |
| | | | 725/93 |

OTHER PUBLICATIONS

"Mariner FieldVu—TV Installation Best Practices", Mariner (2013), Saint John, NB.

\* cited by examiner

IPTV DIAGNOSTICS SYSTEM

FIELD

Diagnostics systems for television provided using internet protocol (IPTV).

BACKGROUND

IPTV installation pose technical difficulties when an installer attends a customer premises. The procedures may be difficult and time consuming if the installer must run through a number of tests. Complications also arise if the IPTV installation is running Microsoft Mediaroom™ video platform since it has functions that are not necessarily visible to the installer and may interfere with the diagnostics carried out during the installation.

SUMMARY

Methods and apparatus are disclosed for efficient IPTV installation and diagnostics.

In an embodiment, there is provided a method of testing a video decoding device connected to an IPTV service, the IPTV service having a server, the method comprising tuning the video decoding device to a first channel of the IPTV service, the video decoding device receiving the first channel and decoding video from the first channel, the video decoding device collecting data concerning the decoded video and sending the data to the server, detuning the video decoding device from the first channel, the server analyzing the data to generate results; and the server displaying the results.

In another embodiment, there is provided a method of testing multiple video decoding devices connected to an IPTV service, the IPTV service having a server, the method comprising tuning the multiple video decoding devices to a first channel of the IPTV service, each of the multiple video decoding devices receiving the first channel and decoding video from the first channel, each of the video decoding devices collecting data concerning the respective decoded video and sending the data to the server The server analyzing the data to generate results and the server displaying the results.

In a further embodiment, there is provided a method of testing multiple video decoding devices connected to an IPTV service, the IPTV service having a server, the method comprising tuning each of the multiple video decoding devices to a respective channel of the IPTV service, each of the multiple video decoding devices receiving the respective channel and decoding video from the respective channel, Each of the video decoding devices collecting data concerning the respective decoded video and sending the data to the server, the server analyzing the data to generate results and the server displaying the results.

A diagnostics generating apparatus is also provided comprising a video platform server, the video platform server being configured to communicate with a set top box to tune and de-tune the set top box and obtain diagnostics information from the set top box; and an installation server configured to exchange control messages with a video platform server upon initiation of a diagnostic text sequence and generate diagnostic results for display to a user.

Depending on the results of the testing, the installer may modify or adjust any one or more operational parameters of the STB, modem or other installation equipment.

BRIEF DESCRIPTION OF THE FIGURES

An embodiment of an installation system will now be described with reference to the figures by way of example, in which.

DETAILED DESCRIPTION

Figure 1:
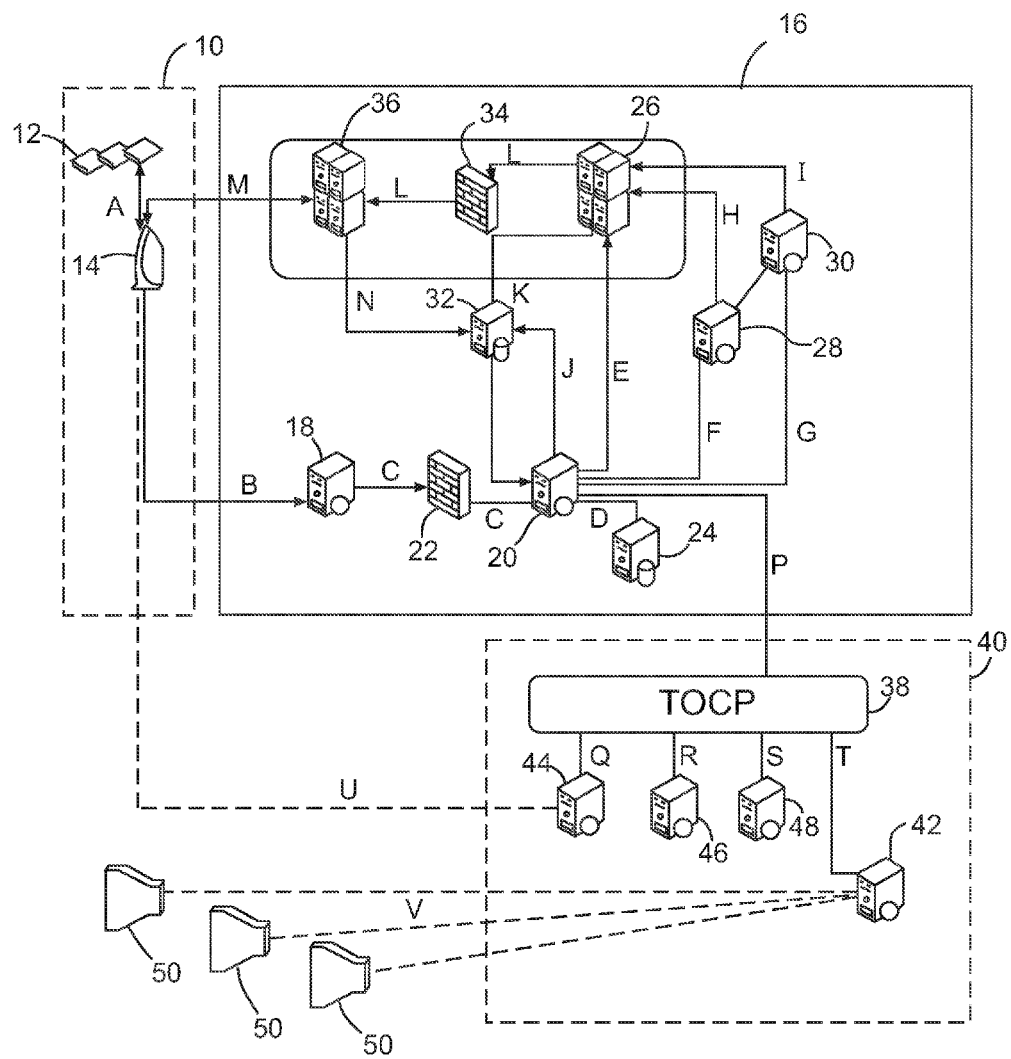
FIG. 1 is a schematic showing an exemplary embodiment of the system architecture.

This document describes an IPTV (Internet Protocol Television) installation system for use in installing an IPTV system in a user's premises. Users here include individuals, businesses, for example hotels, and remote locations such as camps. The installation system is described for use with Microsoft Mediaroom™. Microsoft Mediaroom™ is a video platform for operators to deliver IPTV-based Pay-TV subscription services. However, the general principles are also applicable to other IPTV platforms having similar characteristics. The installation system in particular provides as one of its functions an Installer Diagnostics Check system, which may be referred to here as the Klean Install Toolkit (KIT). The installation system uses diagnostics information collected from network elements and devices such as the STBs and compares them against a list of threshold settings using a rules engine and displays the results on the TV in the customer's premise during the TTV installation process. The test results of an installation, or previous test results, may be viewed directly from the video decoding device, or another device such as a mobile phone, tablet or PC via a web application or native application.

The functions of any one or more of the servers described in this patent document may be carried out by one or more servers whether collocated or not.

This document uses the following terms in the context of Document Attachments Enhancements.

Set Top Box (STB) is a Unit/Device used to receive TV service.

Personal Video Recorder (PVR) is hardware STB that allows a user to record and store content. Used interchangeably with DVR.

Digital Video Recorder (DVR) is hardware STB that allows a user to record and store content.

Used interchangeably with PVR.

User is an IPTV customer.

Asset/Program is a program/PPV/VOD available on a STB box.

PVR action includes recording, viewing, deleting, scheduling future recording for an asset.

Live TV is broadcast content viewed while it is being broadcasted.

Asset/Program Information is information that shows up on selecting the information button from the remote. Clicking information button twice bring up detailed information for the asset/program.

Buffer is the length of time that the system is temporarily recording while a user is watching TV or is in pause mode.

Scheduled Recording is a recording for which a Date and time is set and PVR scheduling system will automatically start recording the program on the set date and time. The frequency of recording will be determined by the frequency set for a program.

Device is the Set Top Box or other similar video receiving and decoding devices that are compatible with Mediaroom, including but not limited to CISCO IPTV STBs, Motorola IPTV STBs, Microsoft Xbox Orapa, and Microsoft Xbox Carbon. When a device being tested for diagnostics is referred to is includes a video decoding device such as a STB, xBox, mobile phone, tablet, smart TV, DSLAM and Modems/Residential Gateways. A Residential Gateway is the term given to a device that contains a DSL Modem with an Ethernet switch built in.

Guide is an electronic program guide (EPG) or Interactive Program Guide (IPG).

OSS means Operational Support Systems.

BSS means Business Support Systems

DRA is a Disaster Recovery Application which is the first stage of booting up a new STB which downloads and installs a basic version of the operating system so that it can download the provisioned client software.

Counteror Diagnostics Counter is a Mediaroom™ diagnostics counter which is a measurement point from the STB diagnostics.

ICC means Instant Channel Change.

ICC Stitch means the process that occurs when the STB changes from the Unicast burst video to the multicast video stream in a carefully timed operation that should result in only one hole to be filled by DServer retransmission.

Hole is a gap of one or more packets in a network stream usually caused by packet loss.

DSLAM means Digital Subscriber Line Access Multiplexer.

KIT or Klean Install Toolkit means an embodiment of the disclosed installation system.

HDM means Home Device Manager.

TOCP means Telecom Operations Communication Pack.

POTS means Plain Old Telephone Service.

GPON means Gigabit Passive Optical Network (Fiber to the home).

FTTH means Fiber To The Home.

CLID means caller line identification.

NAT means network address translation.

The installation system collects information from Mediaroom™ or such other video platform is being used. Although the term Mediaroom™ is used in the description, it will be understood that its functions may be carried out by other video platforms, including over the top video platforms, for IPTV. The information collected is account and device configuration and device performance data. The account and device information is retrieved using the Mediaroom™ BSS/BSS2 Web Services and the device performance data is collected via the OSS/OSS2 Web Services. Information is collected as well from DSLAMs and DSLAM single lines and/or bonded lines and collect information from other network elements for example in-home Residential Gateways.

Today most of the DSLAMS can be managed and queried by a commercially available DSL manager server such as the Assia™ DSL Expresse product. The product exposes northbound APIs in the form of Web Services. This is the mechanism that can be used to retrieve the data required for KIT. The northbound application programming interface (API) on a software-defined networking (SDN) controller enables applications and orchestration systems to program the network and request services from it. SDN is a "stack" architecture that separates the network control plane from the forwarding plane and centralizes it in a controller that defines forwarding behavior through high-level policy. The northbound API presents a network abstraction interface to the applications and management systems at the top of the SDN stack.

In the present embodiment, the API service to use to get DSL diagnostic performance data for a line or port is the REAL_TIME web services which provide a current snapshot view of the DSLAM data. The REAL_TIME services provide 4 reports that are available via the getData( ) method. The report that is best suited for the KIT testing is the REAL_TIME_DIAGNOSTIC_DATA report. In a preferred embodiment, KIT should retrieve all of the data from this report.

DSL bonded lines is the term used when one or more lines (copper pairs) are bundled together so that the data can be modulated across multiple phone lines to provided a higher throughput speed. Bonded lines require the DSLAM to support the bonding technology as well as a modem that can receive multiple phone lines in and be able to modulate/demodulate the data from multiple lines. Bonded DSL service using 2 phone lines may use an Actiontec V2000H modem however the technology could support up to 8 or 12 or even higher lines bonded together. The KIT design for DSL Bonding should support up to n lines bonded to avoid any future limitation.

For KIT the impact has two touch points, Diagnostic check/Line Load testing and DSL Diagnostic data.

For Diagnostic Check/Line Load testing, KIT preferably should display the results for each DSL line in the bonded bundle. To accomplish this, KIT must first determine if the line is bonded and how many lines are bonded together. A DSLAM management server, such as the Assia™ DSLexpresse DSL manager server, may be used to provide an API with this information in the provisioning_info web services.

Residential gateways may be managed by a home manager server such as the Alcatel-Lucent/Motive™Home Device Manager which is referred to as HDM. The product exposes northbound APIs in the form of Web Services. This is the mechanism that can be used to retrieve the data required for KIT.

Below is an overview of an exemplary architecture for KIT to interface with getting real-time data from DSLAMs and Residential Gateways. KIT should not have to interface with every network element manager directly as those element managers can and will change over time and therefore should be abstracted by connecting to the TOCP framework which is acting as a service bus.

Where the disclosure uses the term "STB", it should be understood that any suitable video decoding device may be used, which may include, for example, an STB, xBox, mobile phone, personal computer, tablet or smart TV.

Figure 3:
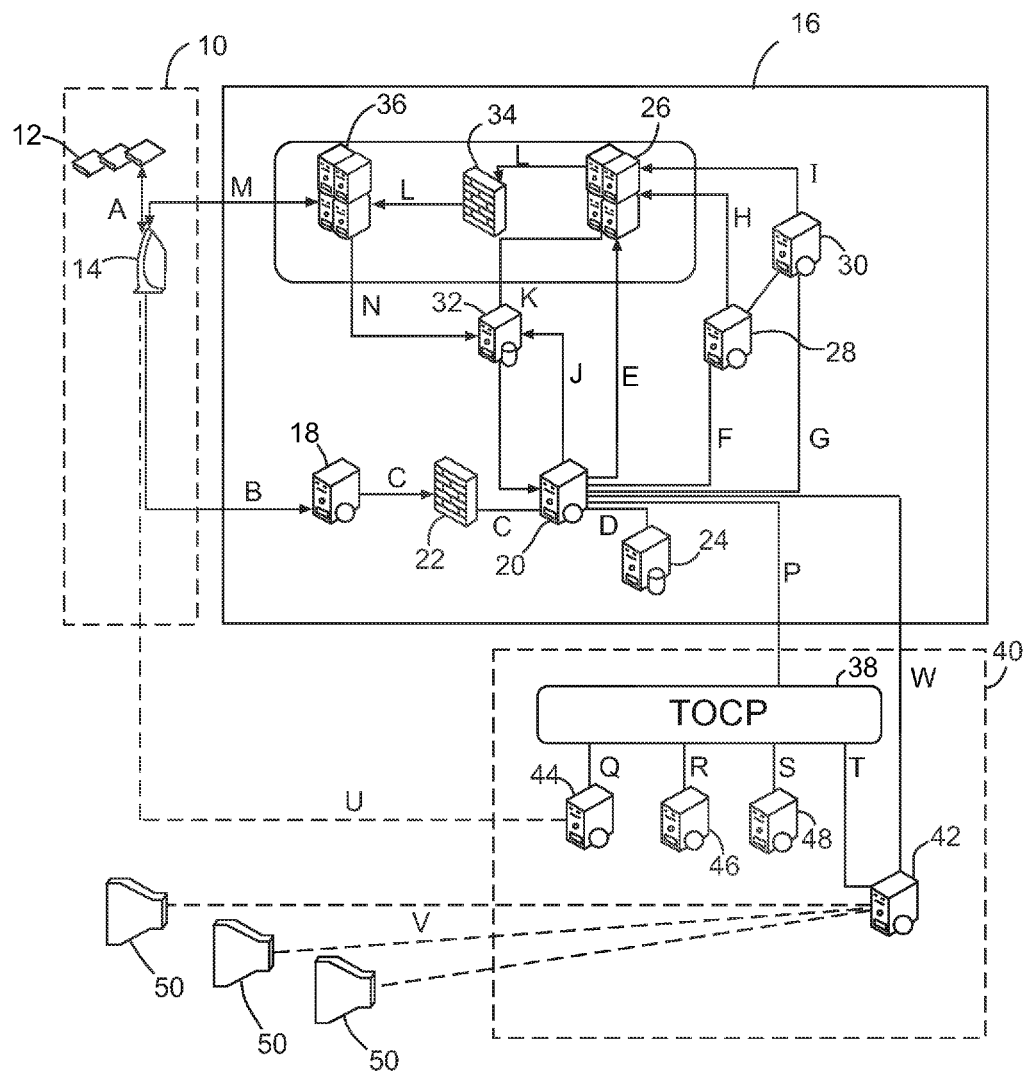
FIG. 3 is a schematic showing an exemplary embodiment of the system architecture.

The following is a description of the communication flows between each element numbered in FIG. 1. FIG. 1 and FIG. 3 are logical diagrams showing the flows between each major component. In an embodiment, flows B, M, U and V would all be on the same physical line from the modem, to the DSLAM and from there through various switching and aggregation network equipment, across the Internet, to more routers and switches and end up on the public facing servers 18.

The customer premises 10 include one or more STBs 12 and residential gateway or modem 14. Flow A is the communication between the modem 14 and the STBs 12 within the home 10. This can be in the form of wired Ethernet over CAT-5 wiring, or wired Ethernet using HPNA (Home Plug Network Adapter) over Coax cable or electrical plug-ins, or wireless Ethernet using WiFi with a wireless STB or using a standard STB with a wireless network adapter dongle. The communication is STB command and control traffic as well as web application traffic over http/https and the audio/video signals being delivered to the home. At the head end 16 or service provider premises, the residential gateway 14 communicates as designated by flow B with KIT web server 18. The modem 14 provides network address translation (NAT) for the communication B from the STBs 12 to the KIT web server 18. The communication is web data transmitted over http/https.

The public facing web servers 18 which host presentation layer information communicate via flow C with the private facing web servers 20 though a firewall 22. The server or servers 20 are configured to carry out the methods disclosed here and may be referred to as installation servers. The data is http/https web data primarily in the form of Web Services. The private facing web servers which host business layer functionality. The private facing web server 22 hosting the business logic application communicates at D with the database server 24 to retrieve and/or persist information in the database. The business logic application servers 20 communicate through E with the video platform, for example Mediaroom™, Branch management servers 26 which host the video platform OSS and BSS APIs. The business logic server 20 via flow F calls APIs hosted on a purpose built CLID xRef server 28 hosted as Web Services which contains a cross reference mapping of STB device identifiers to customer accounts and customer telephone number. The KIT system uses this service to get the telephone number which is used to retrieve DSL data and assist in correlating to a customer's account. The business logic server 20 via flow G calls APIs hosted on a purpose built R-DVR server 30 hosted as Web Services which contains a Remote DVR services which are used to retrieve customers channel listings information.

The CLID xRef server 28 via flow H calls APIs of the video platform OSS/BSS 26 to synchronize the customer accounts and STB device identifiers cross reference mapping. The R-DVR server 30 via flows I calls APIs of the video platform OSS/BSS to get customer channel listings, list of channels and start/stop recordings. The business logic server 20 via flows J calls a purpose built Synchronous Wrapper 32 which transforms the asynchronous STB diagnostic data collection into a synchronous call with a timeout. The synchronous wrapper 32 may be a stand alone unit or may be built into server 20. This is how the KIT system collects the STB diagnostic data on demand.

The Synchronous Wrapper 32 via flows K calls APIs of the video platform OSS/BSS 26 to send a diagnostic notification request to the STB 12 to request it to dump the diagnostic data and send it back to the Synchronous Wrapper 32. The video platform private facing servers 26 communicate via flows L through a firewall 34 with the video platform public facing servers 36. The flows L include notifications messages that are sent such as STB auto-tuning/de-tuning messages and diagnostic data requests.

The video platform client facing web servers 36 communicate via flows M with the STBs 12 via the Residential Gateway 14 to send notification messages to perform auto-tuning and de-tuning and request diagnostic data to be logged to the servers 36. When the STBs 12 log the diagnostic data, they send it back to the video platform client facing servers 36 over http/https. The STB diagnostic data is sent back as flows N from the video platform client facing servers 36 back to the Synchronous Wrapper 32 that initiated the request. The Synchronous Wrapper 32 formats the diagnostic data and sends it back to the Business Layer server 20 via flows O if returned within the timeout period, otherwise it returns a timeout message.

The Business Layer server 20 communicates via flows P with the TOCP API bus 38 in OSS network 40 to call Web Services to communicate with DSLAM manager server 42 and HDM 44 to collect DSL diagnostic data and Modem diagnostic data respectively.

The TOCP API bus 38 communicates via flows Q with the HDM (Home Device Manager) server 44 which communicates via flows U to home devices 14 such as modems and/or residential gateways. The communication is used to request the diagnostic data from the devices 12 and 14. The TOCP API bus 38 communicates via flows R with a database 46 that contains the mapping of DHCP assigned IP addresses to network. The database 46 is used to determine the mapping of an IP address to a modem/residential gateway device identifier and may be stored in any suitable device. The TOCP API bus 38 communicates via flows S with a database 48 which aggregates data from various network elements and is used for correlation of network devices in the path of service delivery. Database 48 is a hierarchical parameter store (HPS) that is a bottom up view of the network devices connected in the path of the delivery of service from the service provider network to the modem at the customer site. The TOCP API bus 38 communicates via flows T with the DSLAM device manager server 42 to collect real-time configuration, diagnostic and performance data as well as historical diagnostic and performance data. The HDM server 44 communicates via flows U with the in-home devices such as modems and/or residential gateways 14 to collect real-time configuration, diagnostic and performance data using the TR-069 specification for CPE Wan Management Protocol. The DSLAM device manager server 42 communicates via flows V to the DSLAMs to collect real-time configuration, diagnostic and performance data.

Both HDM and DLS Expresse require a ServiceID to query specific element. An exemplary architecture has the Service ID primarily in the form of a 10 digit telephone number which often corresponds to the telephone number of the customer's POTS line. Exceptions occur when a customer is an Internet only customer or a TV only customer without home phone service from the service provider. Also GPON/Fiber-To-The-Home customers can't get analog POTS service so and instead get a Derived Voice/VoIP service however there are two ServiceIDs associated with the GPON connection for provisioning, one at each end of the service. These exceptions need to be accounted for in the design.

An exemplary architecture has KIT getting the IP address of the residential gateway by inspecting the HTTP request from the STB running KIT. Because the residential gateway is configured to use routed mode, it is NAT'ing the STB requests and the KIT presentation layer server see's the http request coming from the residential gateway IP address. KIT can use this IP address and make a call to RCS via TOCP to get the ServiceID. The ServiceID can then be used to query DSL Express and/or HDM via TOCP. In some configurations, the residential gateway switch is configured to Bridge the STB IP addresses, thus the IP address seen by the server is the actual STB address and not the residential gateway address, thus the design must consider an alternate way of determining the residential gateways unique device identifier in this instance.

In an embodiment, the calls to get the DSLAM data and the Res Gateway data should occur asynchronously in parallel with the collection of the STB data. This ensures that the overall data collection time is optimized to reduce the installer's time waiting for results.

FIG. 3 shows a design of the system architecture without the TOCP layer. It differs from FIG. 1 on the flow from the KIT business layer to the DSL manager server 42 as depicted by connect W. The business layer connects directly to DSL manager server 42 rather than via the TOCP service abstraction layer.

The KIT server 20 will get the ServiceID required by HDM 44 and DSL manager server 42 by using Caller ID Cross Reference database 28. KIT server 20 will call the CLIDxRef Web Services and find the telephone number associated with the STB DeviceID or AccountID using the selected method. This is not as good as using TOCP but should work for most DSLAM customers.

When only a portion of the data available via the DSL REAL_TIME reports is available via the adapter, the KIT server 20 may interface directly with DSL manager server 42 to get the data required. The KIT server 20 may use the HDM Northbound APIs directly rather than through TOCP if the integration timelines takes too long. The integration of TOCP with RCS and HPS may be included with the HDM integration to provide the KIT server 20 with all of the required services such as finding a ServiceID (i.e. Telephone number) using a resourceID such as the IP address of the Residential Gateway.

KIT is a real-time data collection tool/system that collects data from the intelligent devices and other systems to get an up to the minute (or as close as possible) view of the performance of the elements in the path of the TV service so that an objective assessment can be determined on the performance of the system. At the end of the test, the installer may modify or adjust any one or more operational parameters of the STB, modem or other installation equipment. Here, operational parameters include items such as volume levels, or provisioning information such as number of HD+SD channels available for viewing/recording, and passwords or channel subscriptions, and any other feature or parameter of the IPTV system that an installer might adjust during installation.

The STBs receive and decode the audio and video signals and an STB is the final device in the video delivery path before displaying the images and sound on the television set. The STB collects and measures some performance counters that reset on a channel change and others that only reset upon reboot therefore it is necessary in an embodiment for measuring time dependent changes to establish a baseline level of the diagnostic counters at the start of the test period so that the system can measure changes that occur during the test period. The system can be configured to check the absolute value from the first data collection, and/or the absolute value of the second data collection and/or the delta value calculated as the difference between the second data collection minus the first data collection for a selected parameter. If one or more parameters fail on the first data collection, the device may be put into a failure state and testing is terminated for that device.

Other device data such as DSLAM diagnostics and modem diagnostics are automatically collected from the end device and aggregated into time interval buckets such as a 15 minute window of operational data, therefore establishing a baseline for those devices is not necessary and a single capture of data is sufficient to get the latest performance measurements. Other information such as service configuration or service provisioning is relatively static and is not expected to change during the testing period and therefore a single data collection is also sufficient.

The KIT server 20 should test as many devices as possible at the same time in parallel to accomplish two purposes: (1) Reduce the overall time required to test all of the devices in the path of service; and (2) Capture test data from all devices at the same time so that issues can be correlated across all devices during the same time period.

To test all of the devices at once KIT has implemented a feature called Whole Home Testing which tests all of the devices in the home at once, including all of the STBs. The STB's need to be tuned to a channel and decoding video to generate valid Audio and Video performance measurements. To ensure accurate and reliable STB performance data, KIT has implemented an auto-tuning feature to tune all the STB's to a channel during the test period. With the video platform STB clients it is possible to have a STB auto-tune to a channel and decode the signal even when it is in standby mode where the power button is turned off; however the STB must be detuned otherwise it will continue to remain tuned to the channel indefinitely which can result in unexpected behaviour.

KIT provides two types of tests, 1. Diagnostic Check and 2. Line Load. The basic operation of the two tests is the same with the major differences being the initial setup performed for the STB during the auto-tuning stage and the cleanup performed during the detuning stage. In addition, an exemplary embodiment of the Line Load test deletes temporary recordings during the cleanup stage.

In the Diagnostic Check Test, the installer tunes one STB to a selected channel or the system may automatically select a test channel and then starts the test or the test is started. The system will determine the channel tuned by the installer and will auto-tune all of the other STB's in the home to the same channel so that all devices are tuned to the same channel. Tuning all STB to the same channel provides two benefits; (1) It provides a common reference for the test so that if at least one STB passes the test and one or more STB fail, you can eliminate an issue with the source channel since all the STBs are using the same multicast source; and (2) It ensures that there is no resource conflicts since all STB are using the same channel multicast stream and therefore only one channel in use.

Because High Definition (HD) channels are delivered at higher bitrates and Standard Definition (SD) channels, they more intensive on the delivery of the video stream and therefore installers should be utilizing HD channels for the test when they are available.

The sequence of activities for an exemplary Diagnostic Check Test is: (1) Installer tunes one STB to the desired testing channel; (2) the installer initiates the Diagnostic Test; (3) the system retrieves the current channel number from the STB; (4) the system retrieves the list of all the devices on the account/in the home; (5) the system sends an auto-tune message to all of the other STB's to tune to the same channel; (6) the system waits for the auto-tune message to be received by the other STBs; (7) the system waits for the channel change to complete; (8) the system starts the data collection from each device; (9) the system analyzes the data results and terminates testing for that device if the test fails; (10) the system waits a predefined time period (i.e. 120 seconds); (11) the system starts the second collection of data from the STBs; (12) the system sends a de-tune message to all of the other STB's to release the streams; (13) the system analyzes the data results; (14) the results are stored in the database and (14) the system displays the results.

Figure 2A:
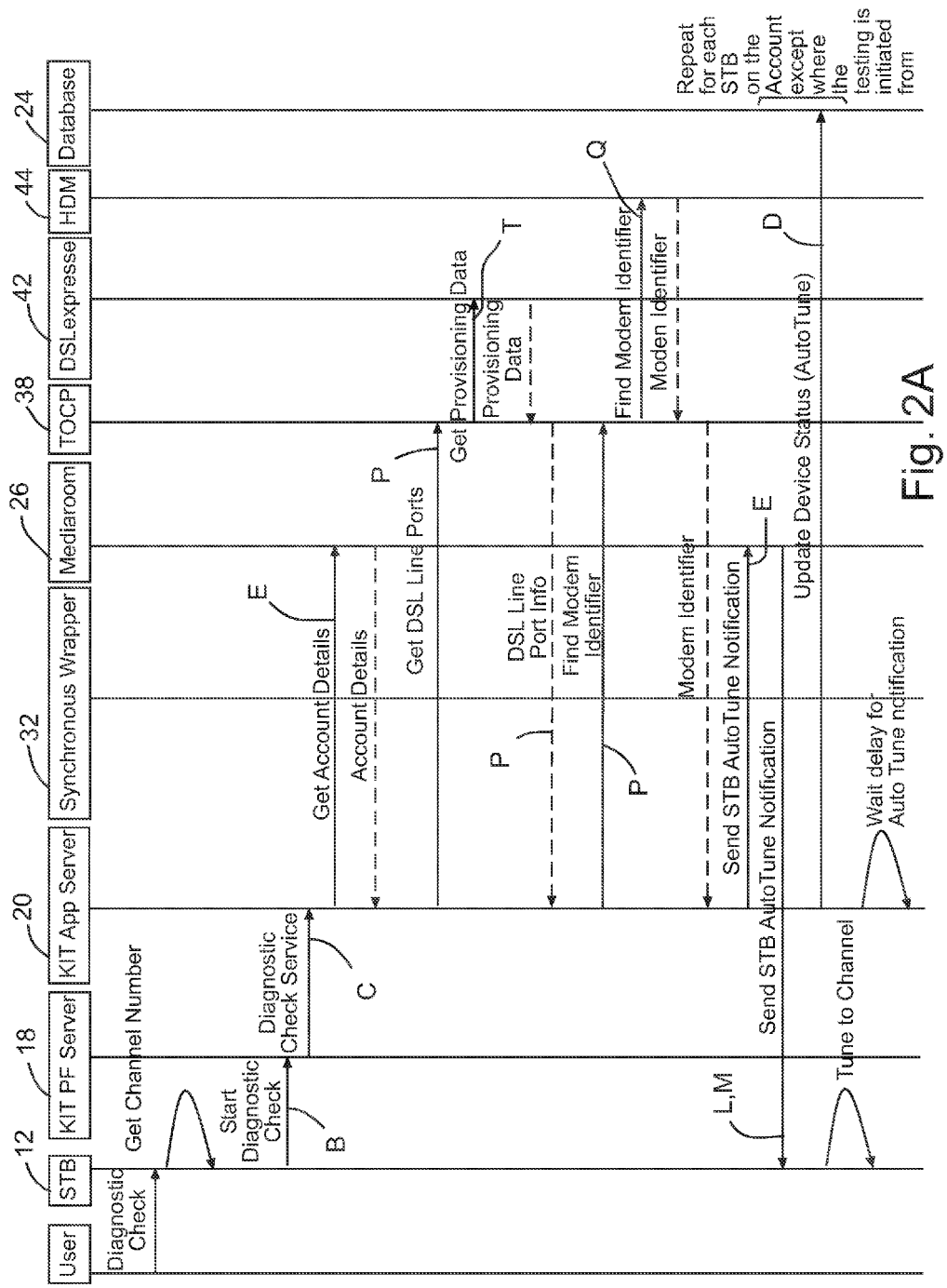
FIGS. 2A, 2B and 2C are collectively a sequence diagram showing process steps during a diagnostic check test, each figure being read as joined together with the vertical lines being continuous between figures.
Figure 2B:
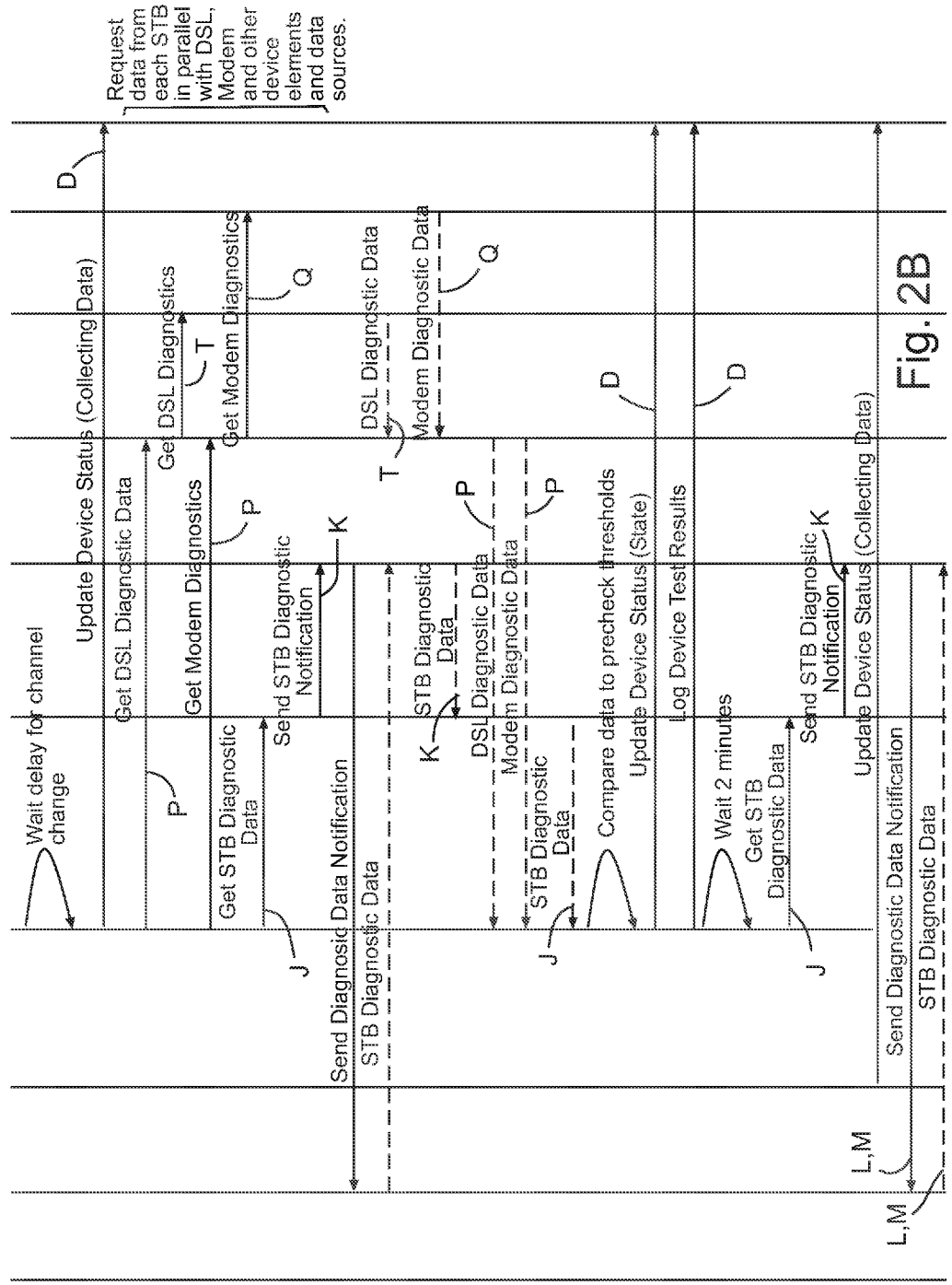
Figure 2C:
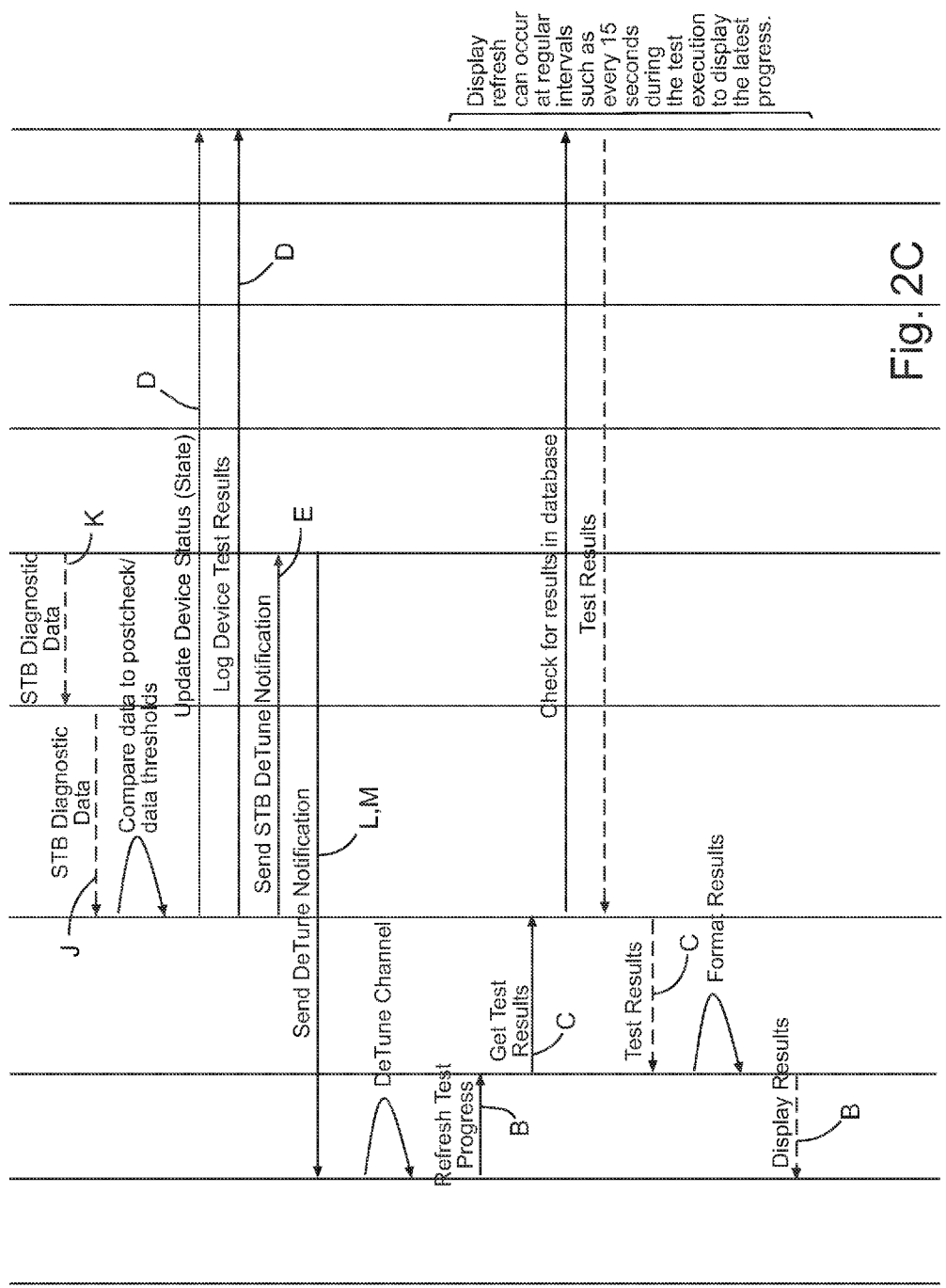

FIGS. 2A, 2B and 2C are together a sequence diagram that shows the interaction between KIT and the major components during the diagnostic check test. Letters used correspond to the flows or parts of flows in FIG. 1.

The process is described in relation to a single STB 12, but all commands and messages may be carried out for each STB 12 being installed. To begin the process a user or installer initiates the test by a command sent for example from a conventional remote command module or via an application (app) on a mobile computing device such as a smart phone or tablet to initiate the test (so in that case all the STBs could be on or in standby) to the STB 12. The STB 12 checks for its channel number and starts the diagnostic check by a command (flow B) to the KIT server 18 through modem 14. Server 18 initiates the diagnostic check service by a command (flow C) to server 20. Server 20 requests (flow E) account details from video platform server 26 and account details are returned by video platform server 26. The KIT server 20 also requests (flow P) DSL line ports and modem identifier from TOCP 38. TOCP 38 requests and obtains (flows T and Q) provisioning data from DSL manager server 42 and modem identifiers from HDM 44. The provisioning data is required to determine the number of ports. The TOCP 38 then returns (flow P) the DSL line ports and modem identifiers to KIT server 20. KIT server 20 also sends (flow E) a request for an auto-tune notification to the video platform server 26 for each STB 12 being installed, which in turn sends (flows L, M) an auto-tune notification to the STBs 12. The STB 12 tunes to the channel as instructed by the video platform server 26 and KIT server 20 sends (flow D) a report to database 24 as to which channel it is tuned to. The KIT server 20 waits for an Auto-Tune notification and channel change to occur, and updates (flow D) the database 24 to indicate STB 12 status.

The KIT server 20 then requests DSL diagnostic data (flow P) from TOCP 38, which in turn requests and gets (flow T) DSL diagnostic data from the DSL manager server 42. The KIT server 20 also requests modem diagnostic data (flow P) from TOCP 38, which in turn requests and gets (flow Q) modem diagnostic data from the DSL manager server 42. In a get STB diagnostic data sub-process, (1) the KIT server 20 sends a request for STB diagnostic data (flow J) to synchronous wrapper 32, which in turn (2) sends (flow K) a request to video platform server 26 for diagnostic data from the STB 12, (3) the video platform server 26 requests and gets (flows L, M) STB diagnostic data from the STB 12, (4) STB diagnostic data is sent by video platform server 26 to synchronous wrapper 32, which (5) sends (flow J) the STB diagnostic data to KIT server 20 and TOCP 38 sends (flow P) DSL diagnostic data and modem diagnostic data to KIT server 20. KIT server 20 then compares the diagnostic data it has received to thresholds, and updates (flow D) device status and logs the test results at database 24. KIT server 20 then waits a time period for example two minutes then repeats the get STB diagnostic data sub-process and updates device status (flow D) at database 24 to indicate that it is collecting data. After repeating the get STB diagnostic data sub-process, the KIT server 20 compares the STB diagnostic data again to post check data thresholds, and updates (flow D) device status and logs the test results at database 24.

KIT server 20 then requests (flow E) an STB de-tune notification from video platform server 26, and video platform server 26 sends (flows L, M) a request to the STB 12 to de-tune. The STB 12 de-tunes itself, and sends a refresh test progress command (flow B) to server 18, which sends a get test results request (flow C) to KIT server 20. KIT server 20 requests and gets (flow D) test results from database 24, sends (flow C) the test results to server 18. Server 18 formats the test results and sends (flow B) the test results to STB 12 along with a display command for display to a user. The results may be displayed on the STB 12 or on a mobile computing device using an XML, HTML or other suitable browser. The user may then take appropriate steps to improve the installation depending on the test results.

In another embodiment, the system could keep track of the original channel, tune to a test channel, collect the data, then tune back to the original channel, thus leaving the decoding devices in the original state it was before the test was initiated. In another embodiment, the system could mute the decoding device before executing the tests then unmuting the tests at the end, thus making it possible to silently run tests at night where muting the decoding device is essential, especially when the decoding device is connected to a stereo amplifier and external speakers to avoid waking a sleeping customer.

In the Line Load test the setup is different because the goal is to test the access line line fully loaded with all of the STB's in use and with all of the HD and SD streams in use which would be the maximum load capacity that a customer could apply to the service. For this test scenario there are a few different variants which impact the setup: (1) the customer has one or more STB's in the home; (2) The customer may have zero or more DVR (Digital Video Recorder) STBs which can consume 1 to 4 video streams each; (3) The customer may be provisioned for different counts of HD and SD channel streams, for example: 0HD+2SD, 1HD+2SD, 2HD+1SD and 3HD+1SD; (4) The customer belongs to different service regions where the channel listings can vary for the same channel content; (5) Customers may subscribe to different channels and channel packages and therefore the list of available channels can vary; and (6) The customer may have existing recordings in progress or scheduled to start recording soon.

The system may consider all of the above variables when establishing the setup stage for the Line Load test. First the system must first check if recordings are in progress and halt since recordings in progress will interfere with the automated auto-tuning allocation of channels to each device. Then the system may determine the number of STBs on the account and the number of HD and SD streams and decide how to allocate all of the streams to all of the devices.

In some scenarios there will be more STBs than streams (i.e. 5 STB's & 2HD+1SD) so the system can allocate a unique HD or SD stream to each STB until all streams are used, but to ensure that all devices are tested the first HD stream allocated will be assigned to each of the remaining STBs. This ensures that all streams are in use and all devices are decoding video.

In other scenarios there will be more streams than STBs (i.e. 2 STBs & 3HD+1SD) so the system will allocate an HD stream to each available STB until it runs out of HD streams, then assign SD channels to remaining STBs until all the STBs have a stream. This fully utilizes the STBs, but not the streams, therefore if there are DVR STBs in the home, the system will automatically start recordings to utilize the remaining HD and SD streams. To ensure that the system cleans up after itself, the recordings are stopped and deleted at the end of the test to ensure the DVRs are left in the same state as it was prior to the start of the test.

High Definition (HD) channels are delivered at higher bitrates and Standard Definition (SD) channels and therefore they more intensive on the delivery of the video stream so priority is given to HD channels being assigned to STBs where the performance measurements can be collected and any the remaining HD and SD channels are used for recordings when required as performance measurements are not available on recordings.

Once all of the STBs have been assigned a video stream and the recordings have been started (when required) the test can proceed similar to the Diagnostic Check test.

A challenge with the automated auto-tuning of different channels to each STB and starting recordings is that the specific timing is not predictable and therefore it is possible to attempt to consume more streams that available during the setup stage which will cause the STB to display a modal popup box that prevents auto-tuning to work without manual intervention. To overcome this issue, the system may first detune each STB at the start of the setup stage to ensure that no streams are in use which will eliminate conflicts.

If the service provider offers different channel listings in different cities and each customer can personalize their channel subscriptions, the system must determine which channels are currently available for the customer and determine which channels are HD and which are SD and then use those for testing. Although it is not necessary, the system will always allocate the same channels to the same STB if the test is re-run to ensure consistent results and provide a baseline.

The sequence of activities for an exemplary Line Load Test is: (1) the installer initiates the Diagnostic Test; (2) the system checks for existing recordings in progress or recordings that are scheduled to start within the estimated testing duration and halt testing if recordings would interfere with the testing; (3) the system retrieves the list of all the devices on the account/in the home; (4) the system collects the number of HD & SD streams provisioned on the account; (5) the system determines which HD and SD channels are available from the customer's channel lineup to be utilized for testing; (6) the system calculates the number of recordings required to consume all HD and SD streams; (7) the system sends a de-tune message to all STB's to stop all video streams; (8) the system waits for the de-tune message to be received all the STBs; (9) the system assigns an HD or SD channel to each STB; (10) the system sends an auto-tune message to each STB's to tune to the assigned channel; (11) the system starts recordings for the duration of the test on the DVR if a DVR is available and additional streams are available; (12) the system waits for the auto-tune message to be received by each STB; (13) the system waits for the channel change to complete; (14) the system waits for the recordings to start; (15) the system starts the data collection from each device; (16) the system analyzes the data results and terminates testing for that device if the test fails; (17) the system waits a predefined time period (i.e. 120 seconds); (18) the system starts the second collection of data from the STBs; (19) the system sends a de-tune message to all of the STB's to release the streams; (20) the system stops the recordings that were started by the test; (21) the system deletes the recordings; (22) the system analyzes the data results; (23) the results are stored in the database and (24) the system displays the results.

Figure 4A:
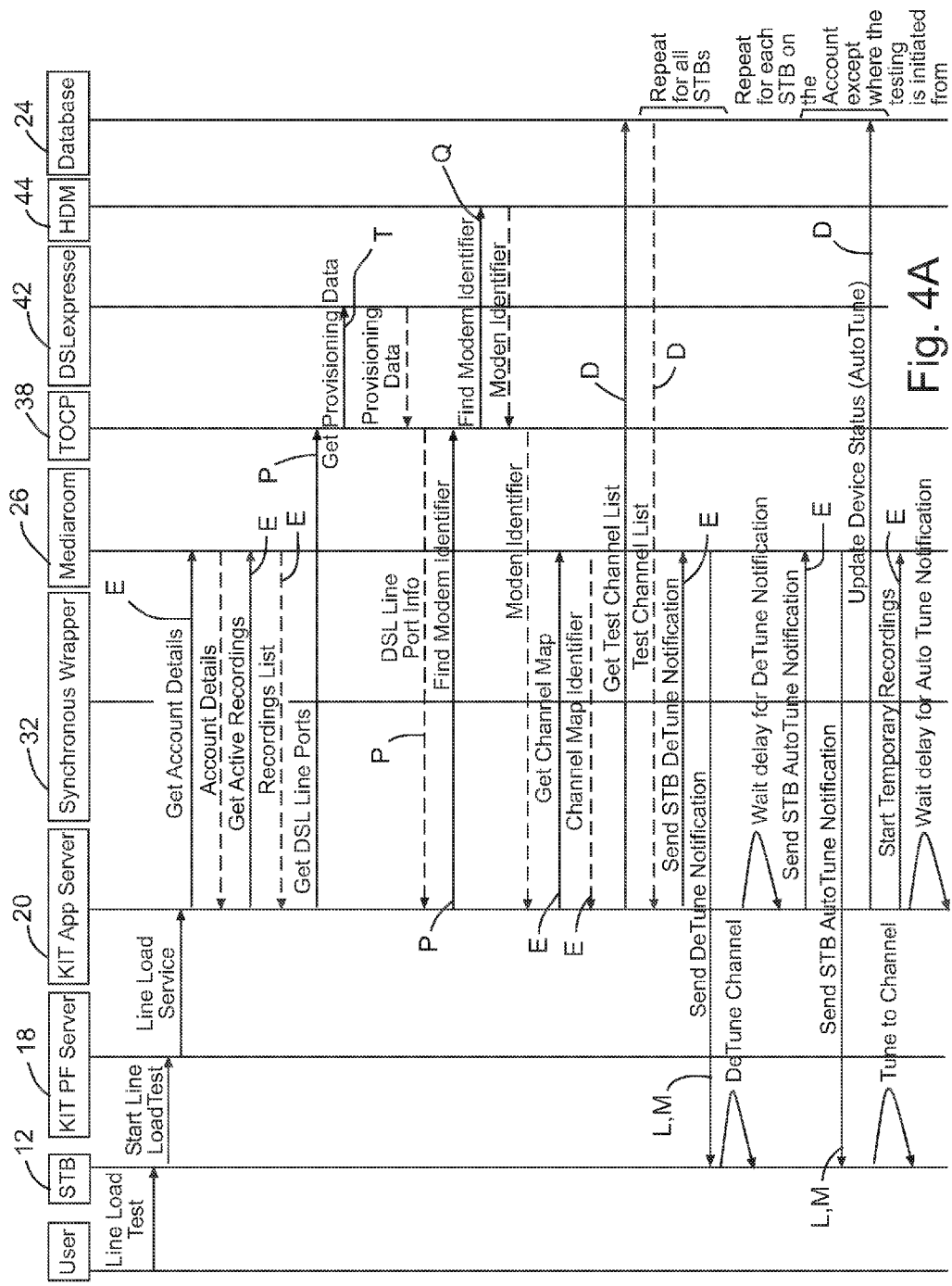
FIGS. 4A, 4B and 4C are collectively a sequence diagram showing process steps during a load line test, each figure being read as joined together with the vertical lines being continuous between figures.
Figure 4B:
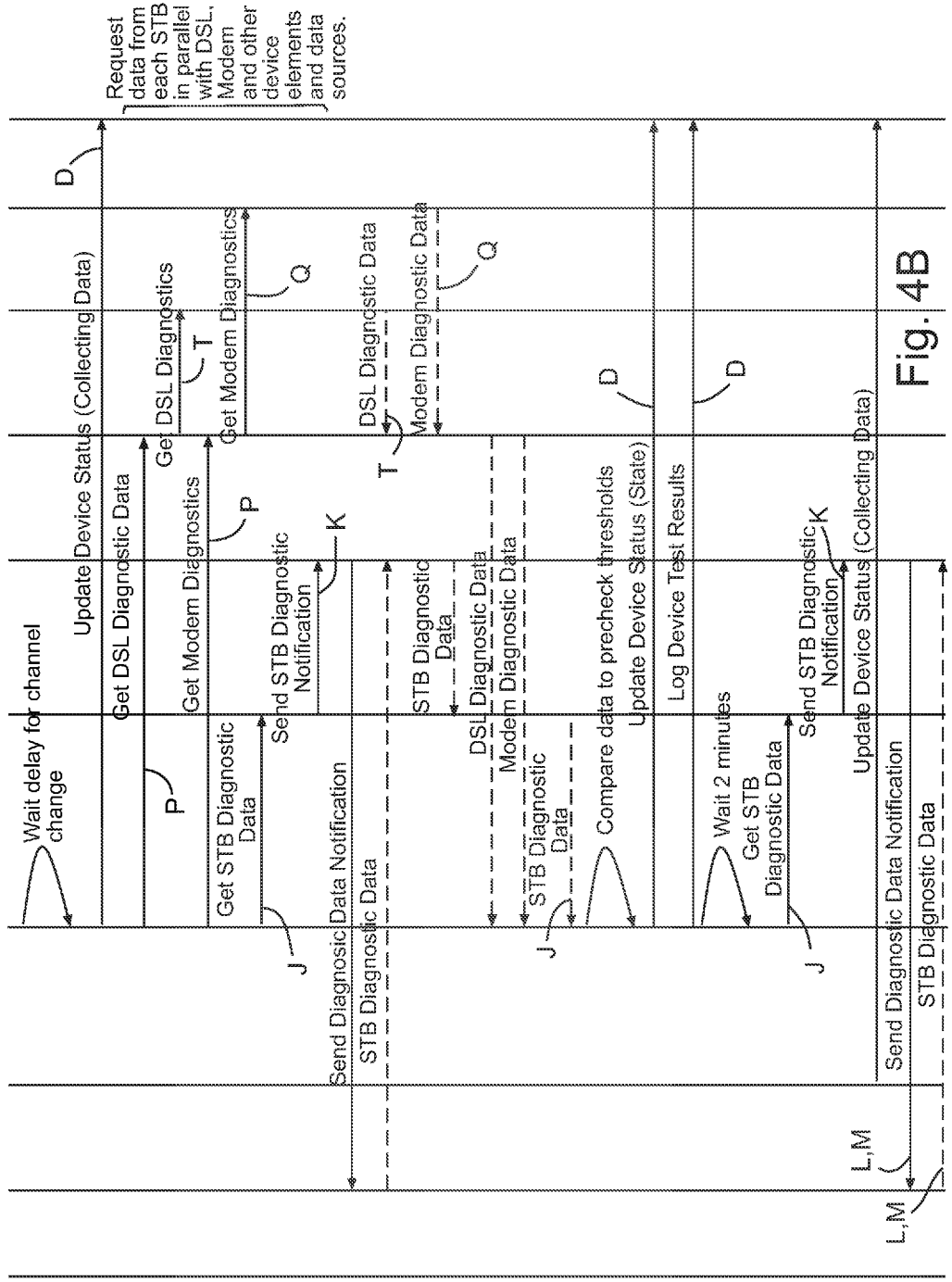
Figure 4C:
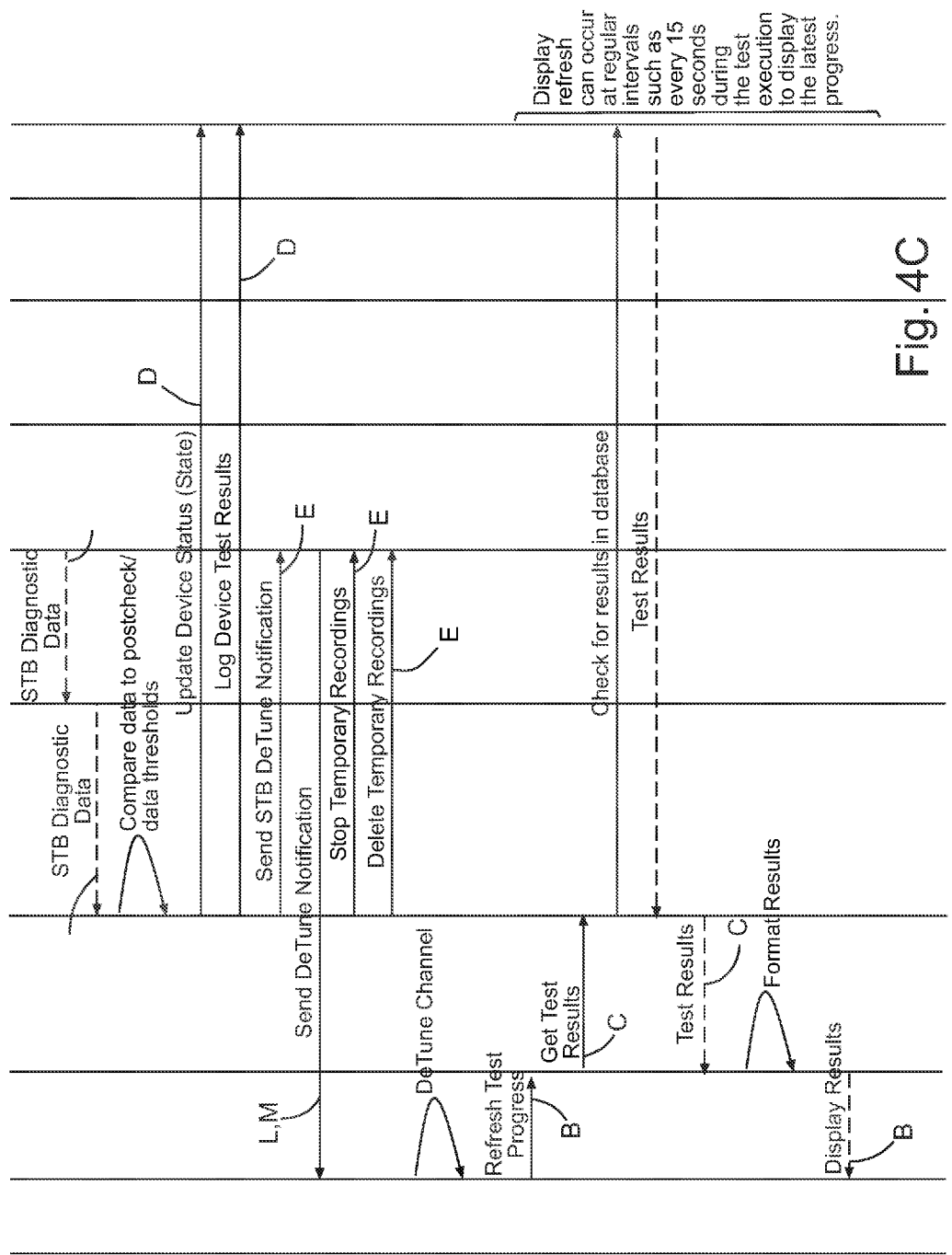

FIGS. 4A, 4B and 4C are together a sequence diagram that shows the interaction between KIT and the major components during the Line Load test. The steps are the same as in FIGS. 2A, 2B and 2C except as follows. It is not required for the STB 12 to obtain a channel number. After obtaining account details, server 20 requests (flow E) active recordings list from video platform server 26 and a recordings list is returned by video platform server 26. After obtaining a modem identifier, server 20 requests (flow E) a channel map from video platform server 26 and channel map identifiers are returned by video platform server 22, and then server 20 requests and obtains (flow D) a test channel list from database 24. After obtaining a test channel list, server 20 sends (flow E) a de-tune notification to video platform server 26, and video platform server 26 sends (flows L, M) a de-tune notification to STB 12, which de-tunes itself from whatever channel it was on. The KIT server 20 waits for de-tuning to occur and then returns to the sequence of FIG. 2 with an auto-tune request, followed by status update. After the status update, KIT server 20 sends (flow E) a message to video platform server 26 to start temporary recordings. The process then returns to the sequence of FIG. 2 until the de-tune notification is sent, upon which the KIT server 20 sends (flow E) a message to video platform server 26 to stop and delete temporary recordings. The process then returns to the sequence of FIG. 2.

In another version the system could detect the existing recordings in progress and auto-tune the STB's using the remaining HD/SD streams available, thus eliminating the need to stop recordings in progress. This is an alternate implementation that eliminates the need to stop current recordings that are in progress.

In another version the system may implement a continuous duration test which will allow the system to run for a longer duration than the pre-configured 2 minute sampling. The longer sampling time will make it possible to detect intermittent issues that do not always appear during the short sampling period. In this implementation the installer starts the test (either Diagnostic Check or Line Load), the test runs for the minimum time period such as two minutes but it continues to run until each device encounters a failure which terminates the test automatically, or the installer manually chooses to terminate the test after some time period. The system will provide status updates at regular intervals by performing additional data samples from the devices so that the installer can monitor the status during the continuous test.

To help ensure consistent and reliable test results, another version of the system may prevent home owners from changing channels while the tests are executing since channel changes interfere with the testing rendering the test results invalid. This may become essential when running the continuous duration test so that the home owner is aware that a test is in progress.

To integrate KIT with DSL data the integration will be done via DSLexpress via TOCP. TOCP provides a mediation layer that abstracts DSLexpress from KIT.

The KIT server 20 must first determine if the line is managed by a management server. This could be a DSLAM management server or a GPON management server or some other access line management server. After the system has determined that the access line is managed by a management server it needs to determine how many resources make up the composition of the access line. For example a bonded DSL service may be composed of 2 or more individual DSL lines to provide higher network speeds. The KIT server must make a call to the DSL Management server to retrieve the provisioning information to determine the number of resources or DSL lines used to deliver the service along with the DSLAM port device identifier so that a REAL_TIME diagnostic data collection can be performed using the DSLAM port device identifier. Next the system must request the line performance data for each individual line using the identifier. Some of the performance data may be assessed and measured individually for each resource/line whereas other performance data, such as total downstream bandwidth, may be calculated as the aggregate of all the individual resources/lines together. Performance data used for diagnostics may include may include data such as modem performance data such as packet error rate, CRC error packets, bytes transmitted, bytes received, current train rate upstream/downstream, switching performance data such as packet error rate, CRC error packets, bytes transmitted, bytes received, packets dropped, packets lost for HPNA connected devices (STB), or similar counters for Ethernet connected devices.

Integration may be done via the DSL Manager directly or via the TOCP integration bus.

Each individual line resource, such as bonded lines, should be displayed on screen as a separate row/entry.

The DSL fields that are candidates for KIT integration are shown below. The list may be different depending on the implementation. The list below shows some example DSL fields. The implementation could include but is not limited to these values

| Value | Comment |
| --- | --- |
| "Raw" Measured operational values | |
| line.operation.<us,ds>.power | The amount of power that the DSLAM and modem are transmitting |
| line.operation.<us,ds>.margin | The margin of signal above the minimum required to theoretically maintain the bit rate. |
| line.operation.<us,ds>.attenuation | The amount that the loop reduces the signal. |
| line.operation.<us,ds>.currentrate | The current sync rate of the port. This can be profitably compared to the requirement for the specific service, but you need to know the service type to do this (2SD, 1 HD, 2HD, 3HD currently) |
| line.operation.<us,ds>.maxrate | The sync rate that the port claims it could run at. Useful as long as it is taken with a grain of salt. |
| line.operation.<us,ds>.delay | The amount of interleaving delay on the port (used to reduce errors) |
| line.operation.<us,ds>.inp | The amount of impulse noise protection on the port (used to reduce errors) |
| "Raw" measured performance values | |
| line.performance.<us,ds>.cv | The number of code violations (line errors) in 15 minute intervals. This is as a comma delimited string, with the first value in the string being the most recent. |
| line.performance.<us,ds>.fec | The number of forward error correction (times that there was an error in the raw data stream that was corrected by INP/interleaving) in 15 minute intervals. This is as a comma delimited string, with the first value in the string being the most recent. |
| line.performance.retrain | The number of resynchronizations in 15 minute intervals. This is as a comma delimited string, with the first value in the string being the most recent. |
| Diagnostics/interpretations | |
| diagnostics.stability | The evaluated stability of the line - very stable, stable, unstable, very unstable or unknown. |
| diagnostics.stability.reason | For lines that are unstable or very unstable, the reason why. This is expressed as a binary number. Bit 2 (MSB) = unstable due to downstream code violations. Bit 1 = unstable due to upstream code violations Bit 0 (LSB) = unstable due to retrains. |
| diagnostics.det.<us,ds>.impulse | Detected significant numbers of impulse noise events. |
| diagnostics.det.unbalanced | Detected apparent unbalanced wiring (a physical fault) |
| diagnostics.det.am | Detected apparent interference from AM stations. |
| diagnostics.det.badsplice | Detected apparent unbalanced wiring (a physical fault) |
| diagnostics.loop_length | The calculated loop length based on measurements. |

How much evaluation the DSLAM manager server will be able to perform on a brand new access line that has just come up when the installer is on site will depend on the service. The DSLAM manager server may use historical performance evaluation data and the time duration of the history may affect its performance evaluation results.

The input for these calls will require a ServiceID. If there isn't a web service available to retrieve the ServiceID using an IP address, namely the Residential Gateway IP address, the system may use the Telephone number associated with the video platform account from the CLID xRef database. This will provide a solution that works in many cases for normal DSL copper installations. ETTS and GPON customers have a fake telephone numbers assigned but DSLAM manager server doesn't manage ETTS & GPON access lines. A telephone number is not needed to associate the STBs, but the telephone number may be tracked when available to easier reporting. The STB's are associated to a customer account and in an embodiment the system may track the account identifier for easier reporting and correlation. When a test is executed a unique session identifier may be generated to correlate all of the devices (STBs, DSLAM lines/ports and modem) using the session identifier so the system can group them together as a test event.

Additional DSL data fields may be required. The table below describes additional fields available in the REAL_TIME API that are required by an exemplary embodiment of KIT for use with DSL.

| Additional Data | |
| --- | --- |
| profile.name | The name of the DSL Port profile. This should be displayed on the summary screen. |
| lineinfo.dslam | The name of the DSLAM which is represented as a CLLI. |
| lineinfo.port | The Rack-Shelf-Slot-Port information of the DSLAM card. |
| dateinfo.data_collection_date | Data Collection DateTime |

An embodiment may create a service that uses the data from a database that can be used to lookup the ServiceID based on the Residential Gateway's IP address and expose it via TOCP. This service must provide access to data that is updated in near real-time so that KIT can make use of the latest information as opposed to relying on data updated via overnight batch processes.

Data models used will depend on developer specifics and do not need to be disclosed.

Retry function: When trying to collect the diagnostic data for the STB, or DSL, or Modem data and an error occurs, the system will initiate a retry with one or more attempts (configurable) based upon selective exception (error) codes. For example, when a TimeoutException is encountered, the system will retry however if a DeviceNotFoundException is encountered no retry is attempted. The retry capability helps improve the reliability of collecting realtime performance data from devices that are often busy delivering service (i.e. delivering video) and thus responding to performance data requests is a lower priority task with limited capabilities and subject to failing more frequently or taking longer to respond. The retry attempts also have a longer timeout (configurable) because there is now some degree of certainty that the device exists and therefore waiting longer increases the probability of getting realtime data from the device.

Although the KIT system is described in relation to DSLAMs and DSL lines, in an alternate implementation the system could also work with other access line technologies such as GPON or wireless where the KIT server 20 could collect diagnostic data from a GPON manager server or a wireless network manager server, in place of, or in conjunction with the DSLAM manager server.

The KIT server 20 may instruct the STB or another display on a mobile computer device at the customer premises to display a progress bar while the test is executing on any one or all of the STBs.

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

What is claimed is:

1. A method of testing multiple video decoding devices connected to an IPTV service via a device or devices at a user's premises, the IPTV service having a server, the method comprising:
during installation of the IPTV service:
tuning each of the multiple video decoding devices at the user's premises to a channel of the IPTV service so that the multiple video decoding devices are tuned to the same channel at the same time;
each of the multiple video decoding devices receiving the channel and decoding video from the channel;
each of the video decoding devices collecting data concerning the respective decoded video over two or more periods of time separated by a waiting time, and sending the data to the server;
the server analyzing the data to generate results, wherein the server analyzes the data collected from each of the multiple video decoding devices over a non-final period of time of the two or more periods of time before a period of time of the two or more periods of time following the non-final period of time and the server compares the analyzed data from each of the video decoding devices over the non-final period of time to a failure criterion and terminates testing for any video decoding device for which the respective analyzed data satisfied the failure criterion; and
the server displaying the results.

2. The method of claim 1 further comprising the step of the server collecting information concerning an account associated with the multiple video decoding devices and information concerning configuration of the multiple video decoding devices and the server including the account and device configuration information in the displayed results.

3. The method of claim 2 in which the server collects the account and device configuration information from IPTV platform software.

4. The method of claim 1 further comprising the step of the server collecting data concerning performance of one or more devices and the server including the device performance data in the displayed results.

5. The method of claim 4 in which the one or more devices includes one or more of the multiple video decoding devices.

6. The method of claim 4 in which the server collects the device performance data from IPTV platform software.

7. The method of claim 1 further comprising the step of the server collecting diagnostic performance data for a line or port connecting the multiple video decoding devices to the server and the server including the diagnostic performance data for the line or port in the displayed results.

8. The method of claim 7 in which the diagnostic performance data for the line or port is collected from an API on a software-defined networking controller for a DSLAM for the line or port.

9. The method of claim 7 in which the multiple video decoding devices are connected to the server using a bonded line comprising multiple lines and the server collects diagnostic performance data for each of the multiple lines and includes the diagnostic performance data for each of the multiple lines in the displayed results.

10. The method of claim 1 further comprising the step of the server collecting information concerning a residential gateway to which the multiple video decoding devices are connected, and the server including the information concerning the residential gateway in the displayed results.

11. A method of testing multiple video decoding devices connected to an IPTV service, the IPTV service having a business logic server, the method comprising: during installation or testing of the IPTV service, initiating installation or testing by the business logic server, including:
the business logic server sending messages to the multiple video decoding devices to cause the multiple video decoding devices to tune to a respective channel or channels of the IPTV service; each of the multiple video decoding devices receiving the respective channel or channels and decoding video from the respective channel or channels;
each of the video decoding devices collecting data concerning the respective decoded video over two or more periods of time separated by a waiting time, and sending the data to the business logic server;
the business logic server analyzing the data to generate results, wherein the business logic server analyzes the data collected from each of the multiple video decoding devices over a non-final period of time of the two or more periods of time before a period of time of the two or more periods of time following the non-final period of time and the server compares the analyzed data from each of the video decoding devices over the non-final period of time to a failure criterion and terminates testing for any video decoding device for which the respective analyzed data satisfied the failure criterion; and
the business logic server storing and displaying the results.

12. The method of claim 11 further comprising, after collecting data, the business logic server sending a detuning message to each of the multiple video decoding devices to cause the multiple video decoding devices to detune from the respective channel or channels.

13. The method of claim 11 in which the multiple video decoding devices are caused to tune to the same channel at the same time.

14. The method of claim 11 further comprising, prior to sending messages to cause tuning of the multiple video decoding devices, the business logic server sending a detuning message to each of the multiple video decoding devices to cause the multiple video decoding devices to detune, and then causing the multiple video decoding devices to tune to different respective channels.

15. The method of claim 11 in which one or more video decoding devices of the multiple video decoding devices also are caused to record video during the test by the business logic server.

16. The method of claim 15 further comprising video recording of one or more video decoding devices being tuned to respective further channels different from the channels to which the multiple video decoding devices are tuned.

17. The method of claim 11 further comprising the business logic server detecting that a recording is already in progress on a first video decoding device of the multiple video decoding devices, the recording being tuned to a first channel, and the business logic server tuning each of the multiple video decoding devices to respective channels different from the first channel.

18. The method of claim 17 in which one or more video decoding devices of the multiple video decoding devices are also caused to record video during the installation or testing by the business logic server, the video recording of the one or more video decoding devices being tuned to respective further channels different from the channels to which the multiple video decoding devices are tuned, and different from the first channel, the recording in progress not being disturbed.

19. The method of claim 16 further comprising the step of deleting the video recordings caused by the business logic server.

\* \* \* \* \*